(12) United States Patent
Soukiassian et al.

(10) Patent No.: US 7,000,658 B1
(45) Date of Patent: Feb. 21, 2006

(54) PRECISION ADJUSTABLE WOODWORKING PLATFORM

(76) Inventors: Harry Soukiassian, 510 N. Francisca St., N.A., Redondo Beach, CA (US) 90277; Mike Tschoepe, 1337 20th Pl., San Pedro, CA (US) 90732; Russell A. Wilson, 16204 Spinning Ave., Torrance, CA (US) 90504

( * ) Notice: Subject to any disclaimer, the term of this patent is extended or adjusted under 35 U.S.C. 154(b) by 0 days.

(21) Appl. No.: 11/041,109

(22) Filed: Jan. 24, 2005

Related U.S. Application Data

(60) Provisional application No. 60/539,715, filed on Jan. 29, 2004.

(51) Int. Cl.
  *B27M 1/00* (2006.01)
  *B25H 1/10* (2006.01)

(52) U.S. Cl. ............ 144/3.1; 144/2.1; 144/286.5; 144/114.1

(58) Field of Classification Search ............ 144/253.1, 144/253.5–253.8, 3.1, 2.1, 285, 287, 286.1, 144/286.5, 114.1; 83/471, 471.2, 472, 473, 83/474, 477, 477.1; 269/289 R
See application file for complete search history.

(56) References Cited

U.S. PATENT DOCUMENTS

| 5,868,185 | A | * | 2/1999 | Poling et al. ............ 144/286.5 |
| 5,890,523 | A | * | 4/1999 | Johnson ................... 144/286.5 |
| 6,212,983 | B1 | * | 4/2001 | Pyle .............................. 83/34 |
| 2004/0144445 | A1 | * | 7/2004 | Cassese et al. .............. 144/2.1 |

* cited by examiner

*Primary Examiner*—Derris H. Banks
*Assistant Examiner*—Shelley Self
(74) *Attorney, Agent, or Firm*—Monty Koslover

(57) ABSTRACT

A precision adjustable woodworking platform that is self-calibrating and designed to move a tool very accurately back and forth horizontally and up and down. One of a number of different woodworking tools is fastened in a saddle that can be rotated and set at a selected angle for operations such as mitering. A floating work table is provided for holding a workpiece at any angle to a cutting tool movement direction. At the same time, the floating work table can be moved precisely forward and backward. The invention woodworking platform is relatively inexpensive, while providing for accurate straight, angled and depth cuts; all without needing external instruments.

9 Claims, 5 Drawing Sheets

PRECISION ADJUSTABLE WOODWORKING PLATFORM

CROSS RELATED APPLICATIONS

This application claims the benefit of provisional application Ser. No. 60/539,715 filed Jan. 29, 2004.

BACKGROUND OF THE INVENTION

1. Field of the Invention

This invention relates to woodworking equipment and more particularly to woodworking stands and tables which include provision for working with more than one tool.

2. Background

Woodworking on a small scale is very widely practiced in north America in homes and in small craft workshops. Many types of tools for working and fashioning wood articles such as kitchen furnishings, implements, and even artwork abound. In most cases, the tools require separate stands or mounting attachments in order to be used.

A number of woodworking platforms exist, which provide for use of several different tools on a single platform. However, a set-up and calibration must be made for every tool used, as well as for changes to work angular position. External measuring instruments, must be used to achieve acceptable accuracy in the angle and depth of cuts. For high accuracy, such as an angle cut within plus or minus 1 deg, or a depth cut within 0.005 in., sophisticated external measuring instruments are mandatory. An accuracy better than 0.005 in. is presently achievable only by very skilled and patient hand work. Thus wood artwork can be greatly time consuming and expensive. Even for less accurate woodwork, the extra time spent in set-ups and the high cost of instrumentation are significant and may discourage all but the dedicated carpenter. There therefore remains a need for a woodworking platform that does not require a recalibration and new setup for every different tool used or work angle change, and has a built-in high accuracy, without need for expensive external instruments.

SUMMARY OF THE INVENTION

The invention is a precision adjustable woodworking platform that is designed to have a tool move with respect to a workpiece, either upward, downward, forward or backward, with a built-in accuracy of better than 0.003 in. movement. A number of woodworking tools can be used, with two selected tools being fastened in a saddle which can be rotated and set at a selected angle with an accuracy of +/−1 deg. for operations such as mitering. A floating work table is provided for holding a workpiece, and provision is made for holding a workpiece at an adjustable angle to cutting tool horizontal movement. At the same time, the floating table can be moved precisely forward and backward. The invention woodworking table is self-calibrating and provides for accurate straight, angled and depth cuts, all without needing external instruments.

Accordingly, it is a prime object of this invention to provide a single woodworking platform that can with appropriate cutting tools, perform accurate straight, angled and depth cuts on a workpiece, and use different tools without having to significantly change and recalibrate a set-up.

A secondary object is to provide self-calibration and adjustments as needed, avoiding any need for external instruments.

A further object is to provide an adjustable woodworking platform which is relatively inexpensive to buy and use.

Further objects and advantages of the invention will be apparent from studying the following portion of the specification, the claims and the attached drawings.

DESCRIPTION OF THE PREFERRED EMBODIMENT

The invention is a woodworking platform that not only supports woodworking activities requiring a number of different tools, but includes built-in mechanisms which provide for accurate placement of cuts in a workpiece, including depth and angular position. As a result, few and in most cases, no external instruments are needed for set-up and calibration.

Figure 1:
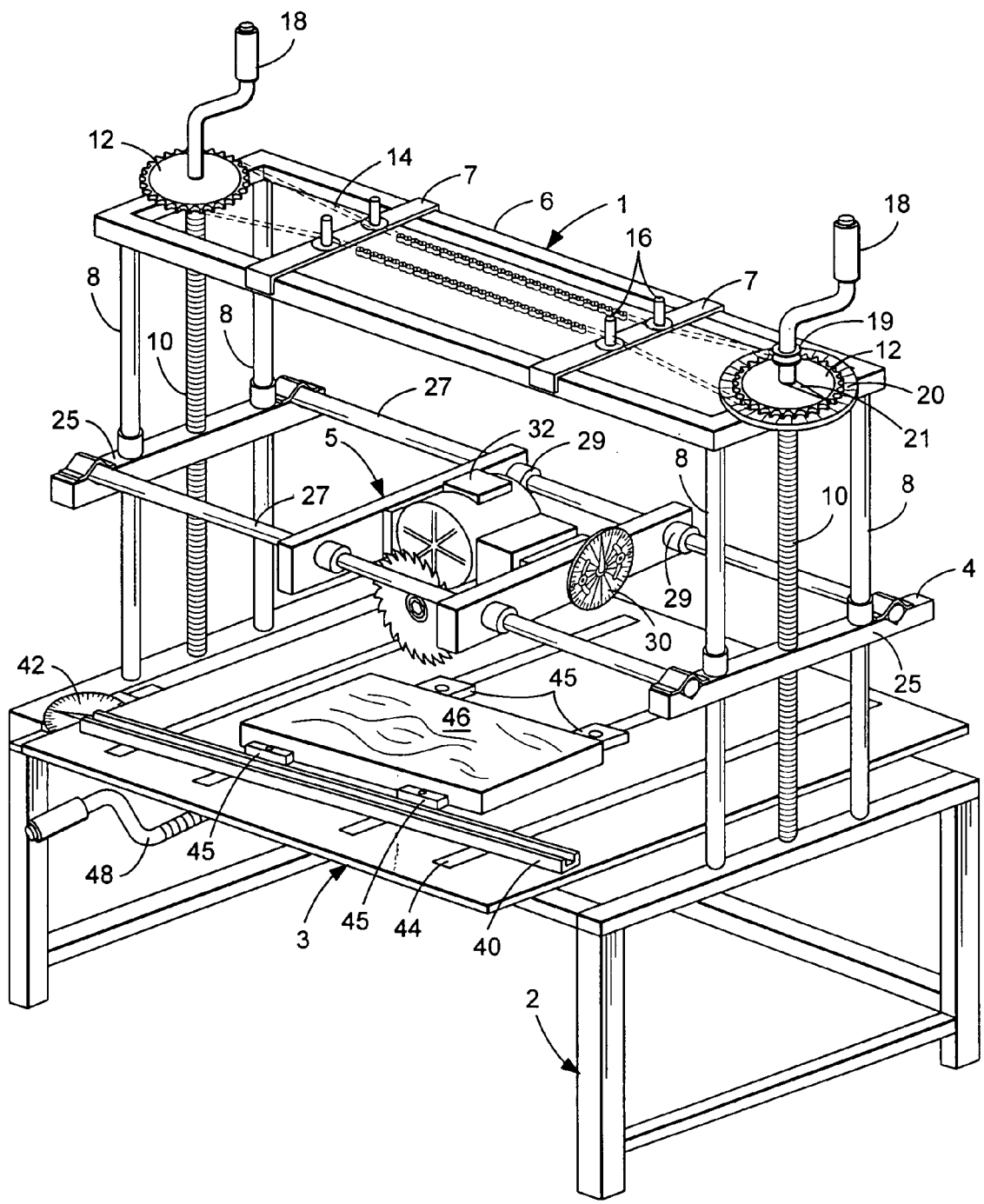
FIG. 1 is a perspective view of a preferred embodiment of an adjustable woodworking platform according to the present invention, particularly showing the platform set up for cutting grooves in a workpiece.

Refer to FIG. 1, which is a perspective view of a preferred embodiment of an adjustable woodworking platform according to the present invention, particularly showing the platform set up for cutting grooves in a workpiece.

A "U" shaped metal upper structure 1 is mounted on the top side pieces of a rectangular, metal table frame 2, forming an upper frame for supporting the platform attachments. Floating on the top of the table frame 2 is a flat, wooden table top 3 for holding work, which can be manually moved forward or backward 6 inches in increments of as little as 0.06 in.

Two one-inch diameter steel rod support legs 8 and a lead screw 10 centered between the legs 8, are attached to the frame at each side for supporting the frame top 6. The support legs 8 are held firmly to the table frame 2 with bolts, whereas the lead screws 10 sit on thrust bearings to allow the lead screws 10 to turn in place.

A transport assembly 4 which supports a tool carriage 5, is attached by end plates 25 to the support legs 8 of the upper structure 1. Each end plate 25 has two holes with bushings that allow the transport assembly 4 to ride smoothly up and down the legs 8. Each end plate also has a center threaded hole to engage a lead screw 10. The lead screws 10 interact with the end plates 25, causing the transport assembly 4, to move up or down along the lead screws 10 when they are rotated. The thread size of the lead screws 10 is typically selected to provide a vertical movement of 0.071 in. for one rotation of the lead screws.

A toothed driver wheel 12 and a handle 18, are attached to a top end of the two lead screws 10, and located above the frame top 6 of the upper structure 1. To ensure that the lead screws 10 at both ends rotate precisely in unison, the driver wheels 12 are connected by a taut link chain 14. Adjustment pins 16, which are mounted on metal strap members 7 that are fastened across the frame top 6, provide a means of tightening the chain 14 as required.

A lead screw rotation indicator plate 20 is fixed to the frame top 6 below the driver wheel 12 on one side of the platform, and a pointer 21 is attached to the lead screw 10. When the lead screws 10 are rotated, the pointer 21, passing over twelve inscribed divisional marks, will indicate the amount of rotation at a given marked position. Since one full rotation produces an up or down transport assembly movement of 0.072 in., each division is the equivalent of a movement of 0.072/12 in. or 0.006 in. A half rotation would produce a movement, up or down, of 0.036 in. The accuracy for any total movement up or down is estimated to be within 0.003 in. This error estimate is based on the tolerance between the lead screw thread and nut thread pitches for class 2 fine-threaded screws, and has been confirmed in a tested model.

An error of 0.003 in. would be considered to be quite acceptable for most carpentry cuts. The invention vertical transport system therefore allows for very accurate up and down movement after the initial settings have been made.

As an alternate to manual rotation of the lead screws, a drive pulley 19 is attached to a lead screw underneath one of the manual drive handles 18. By connection to the drive pulley 19, an attached stepping motor can be used by an operator to rotate the lead screws precisely as needed for up or down movement.

The transport assembly 4 utilizes two long rigid, smooth tubular rails 27 to horizontally support a tool carriage 5, which uses bushings to slide along the tubular rails 27 as needed. A "U" shaped saddle is attached to carriage side plates forming the tool carriage 5, and is used for mounting a drive motor 32 and fixtures for tools. As shown in FIG. 1 a rotating saw blade may be attached to the motor drive shaft. An alternate tool may be a drill bit or another wood cutting/shaping tool. There is also provision for another cutting tool such as a planer to be mounted under the saddle plate. These motor and tool dispositions are shown in some detail in FIGS. 5–8 which are described later.

The saddle in the tool carriage 5 may be rotated through an angle of plus or minus 45 degrees from the horizontal and fixed in any position for tool angular cuts. The selected angle in degrees off horizontal is shown by an indicator pointer on a protractor plate 30 that is attached to one side of the tool carriage 5 and is accurate to one deg. The saddle may also be fixed at 90 degrees to the horizontal, which would be required for vertical cuts.

While the tool carriage 5 can be manually shifted along its horizontal support rails 27 to new positions, fixing the carriage in place will be done by use of removable clamps. Means for precisely moving the tool carriage 5 horizontally, is presently being considered and may be added to the platform.

The floating table top 3 includes a number of spaced apart slots 44 cut from near its front edge to near its back edge; and a fence-protractor assembly made up of a long metal channel fence 40 that has an arrow head pointer at one end, and a protractor 42 mounted on a slidable block. The fence pointer is fastened pivotably to the protractor 42, and the protractor on its block, can be slid along the left edge of the table top with the attached fence 40 to any desired position.

The fence 40 is then set at a selected angle, indicated by the arrow pointer position on the protractor, and fastened with bolts through two or more table slots 44 to the table top 3. A wood workpiece 46 may then be clamped to the table top 3 through slots, using clamps 45, with one edge held against the side of the fence. In this manner, an angle cut position can be accurately set, using the fence 40, and the process of moving and clamping the fence and protractor is repeated for any subsequent angle wood cuts.

Alternatively, the exact location of each cut on the workpiece 46 can also be set by the user turning a handle 48 which is located at the front of the table top 3. The handle 48 turns a lead screw under the table top 3, which engages the table top and slides it forward or backward a maximum of plus or minus 6 inches.

From the foregoing description, it is apparent that few if any, external instruments and measuring devices, are required by an operator for wood working when using the invention platform.

The most unique feature of the invention woodworking platform is the establishment and inclusion of accurate reference points and mechanisms for self-calibration that mostly eliminate any need for external instruments.

The reference point which establishes all future measurements is the flat table top 3 that sits, floatingly on the table frame 2. During assembly of the platform, the vertical position of the transport assembly 4 is carefully calibrated with reference to the table top 3 surface, and mechanical adjustments made if necessary. During this phase, both the end plates 25 of the transport assembly are checked to determine that they are always at the exact same height above the table top surface when they are moved up and down; and are always parallel, opposing each other. This assures an accurate depth of cuts while the tool carriage 5 is moving back and forth horizontally, and while the transport assembly 4 is being moved up and down.

The saddle inside the tool carriage 5 is also calibrated to the table top surface to set the zero degree mark. The way the saddle is set to zero is as follows: the tool carriage holding the saddle without a tool or tool extension block, is lowered to the table top 3 until the saddle lies flat on the table top surface. This represents a zero saddle angle setting, and a pointer that is attached to the saddle, is set at zero angle, corresponding to the horizontal axis. By locking the pointer to the zero marking on the tool carriage protractor 30 plate, any angular movement of the saddle will be represented by the pointer sliding over the protractor 30. The tool carriage 5 is also used to set the fence 40 in zero angle position. To zero the fence 40, it is moved until it abuts the ends of the carriage side plates. The orientation of the fence protractor 42 on its attached sliding block, is adjusted until the fence pointer arrow points to the zero angle mark on the protractor. The protractor 42 is then fastened tightly to the block beneath it, and the fence 40 can then be moved at an angle to a cutting tool and locked in with good assurance of accuracy.

Figure 2:
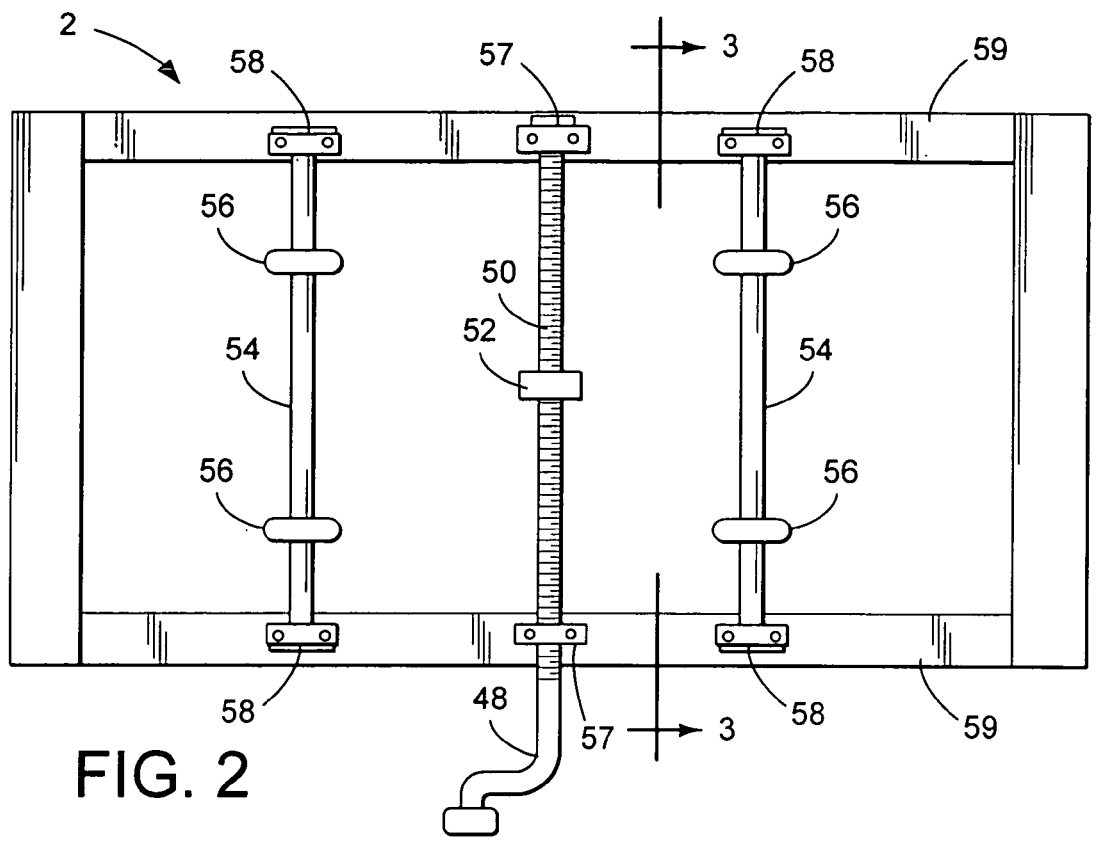
FIGS. 2 and 3 are respectively, a top view of the platform lower frame assembly and an end view taken along line 3—3 of FIG. 2, particularly showing support rods with bushings for holding a floating table top and means for moving the table top forward or backward in small increments.
Figure 3:
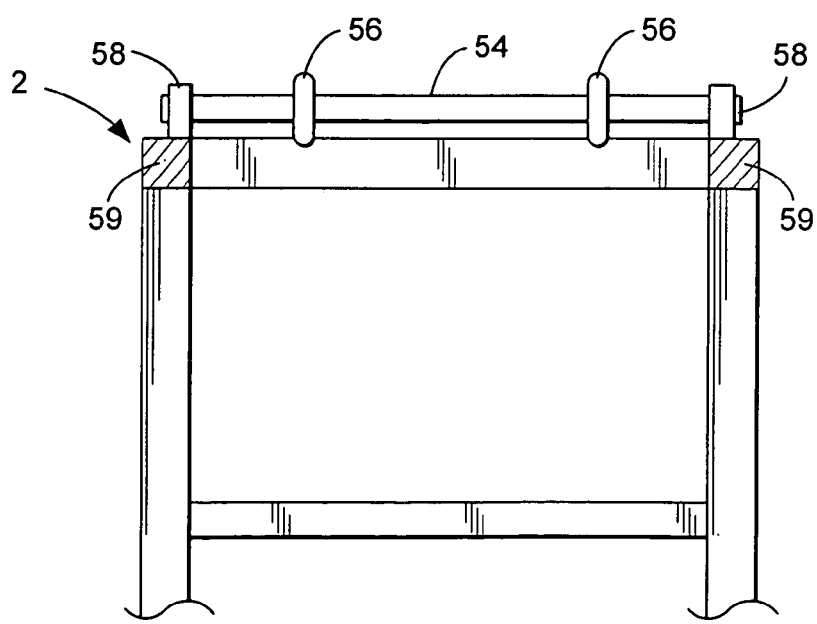

The table top 3 has been described as floating on top of the frame table 2, and the means employed to accomplish this is shown in FIGS. 2 and 3. Refer now to FIGS. 2 and 3 which are respectively, a top view of the frame table 2, and an end view of the frame table taken along line 3—3 of FIG. 2.

Two support rods 54, each with two bushings 56 spaced a distance apart, are mounted 58 in parallel across the frame table metal beams 59. The bushings 56 have a smooth surface and are sized, so that the table top 3 can rest on top of the bushings with good clearance above the frame while sliding forward or back. A lead screw 50 is thrust mounted 57 and located centrally between the support rods 54. It includes a large nut 52 that is located at the center of the lead screw length; and a handle 48 on one end that extends in front of the frame table 2, and is used to rotate the lead screw 50.

The nut 52 has a large flat side that fits closely into a central recess in the under surface of the table top 3. Thus, when the table top 3 is placed on top of the bushings 56 with the nut 52 in place, a rotation of the handle 48 will cause the nut and the table top to move forward or back, depending on the direction of handle rotation. The thread size of the lead screw 50 is selected to produce a given movement increment, such as 0.10 in. for one or more handle rotations. Manual control of the table top 3 forward and backward movement is then quite accurate for most woodworking purposes.

Figure 4:
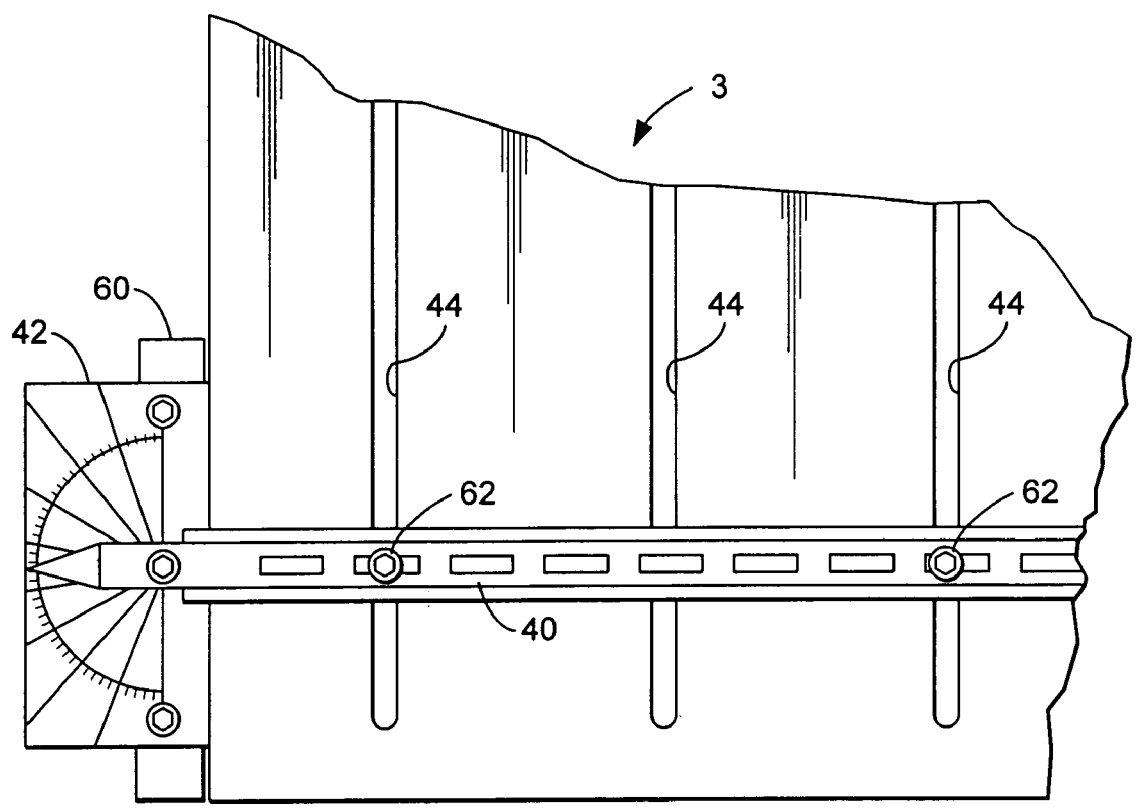
FIG. 4 is a partial top view of the floating table top showing detail of a work angle fence and an angle indicating plate.

Refer now to FIG. 4 which is a partial plan view of the fence 40, shown fixed by fastening bolts 62 through slots 44 to the table top 3. The fence 40 is a long slotted metal channel having a flat, arrow head shaped pointer extending from one end. The pointer is fastened pivotally to a protractor 42 plate which is mounted on a flat-sided support bar 60. When the fence fastening bolts 62 are loosened, the fence 40 can be moved forward on the table top 3 to a new position. When the fence 40 is moved, the protractor 42 and support bar 60 are held against the left edge of the table top 3, and slide along the table top edge. In addition, the existing fence angle may then be adjusted. An angle change of up to 45 deg. from the horizontal position shown in FIG. 4 can be made, and will be so indicated by the fence pointer moving over the protractor 42.

As shown in FIG. 1 and described briefly, a tool carriage 5 with suitable mounted equipment, is used to perform the actual wood cutting and other procedures on a workpiece. The tool carriage 5 described herein is designed to be versatile in its ability to accommodate a number of different tools and also in the varying angles in which the tools can be operated.

Figure 5:
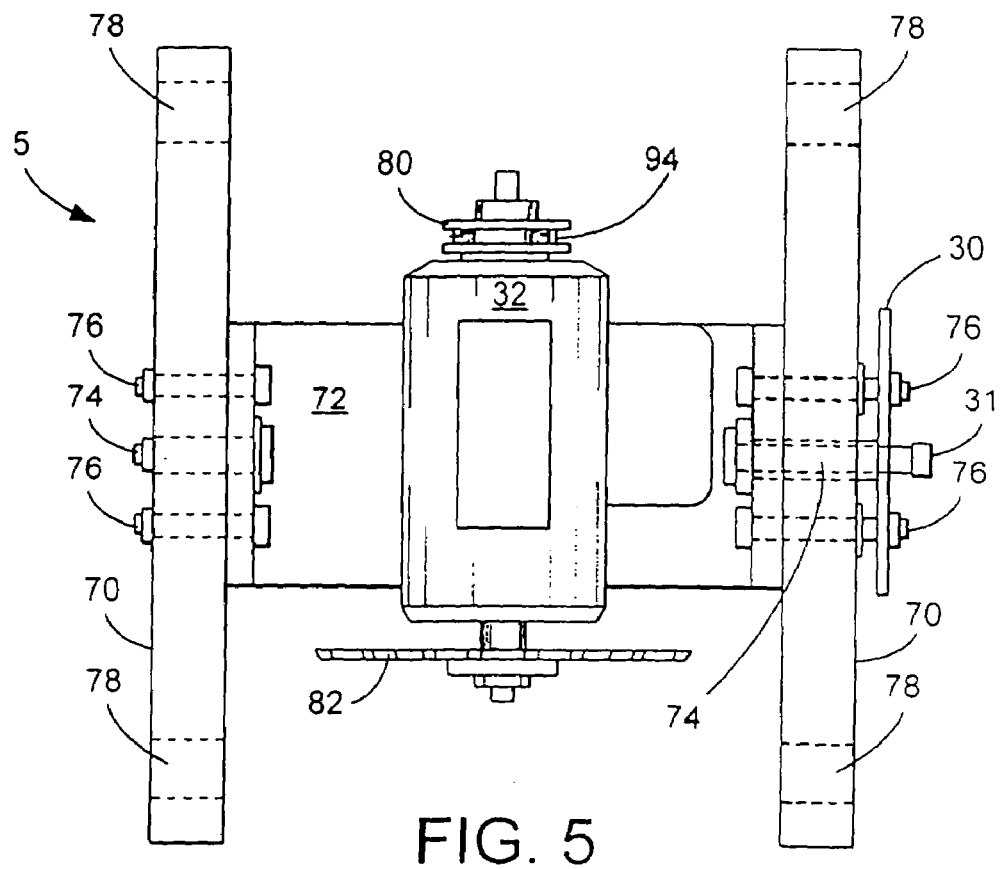
FIG. 5 is a top view of the tool carriage, including mounted equipment.
Figure 6:
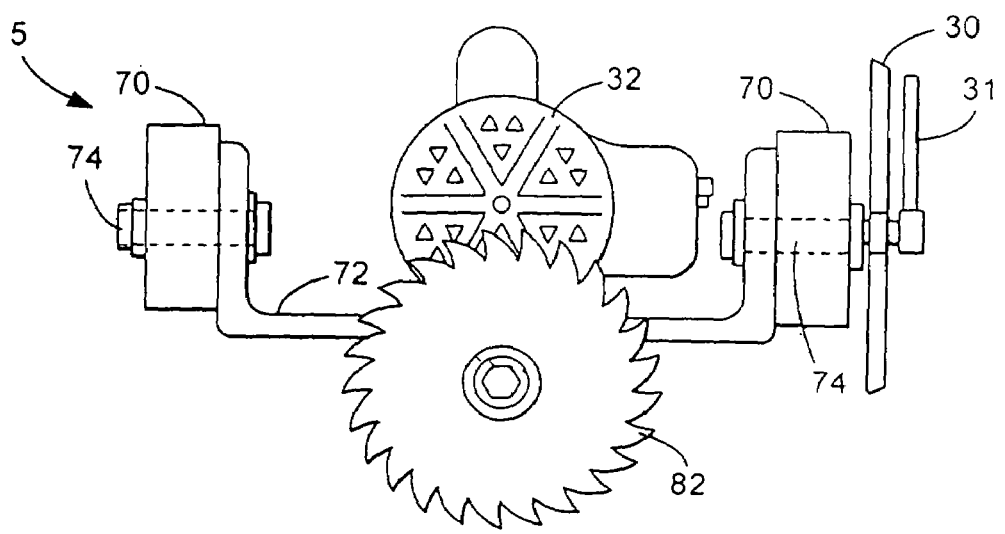
FIG. 6 is a front end view of the tool carriage.

Refer now to FIGS. 5 and 6 which are respectively, a top plan view and a front elevation view of the tool carriage 5, mounting a circular saw blade 82.

Two rigid metal, oblong plate members 70 support between them, a "U"shaped saddle 72 which rests on a pivot pin 74 located in a through hole near to the center of each plate member 70. Both plate members 70 include large holes 78 to accommodate the bushings 29 that are needed for sliding the tool carriage 5 along the horizontal rails 27 of the transport assembly. On the right hand side, as seen from the front of the tool carriage, an arrow shaped pointer 31 is attached to one end of a pivot pin 74 which extends through a protractor plate 30 that is mounted to the side of the right hand plate member 70. The distal end of this particular pivot pin is joined and fixed to the saddle 72. Thus, the pointer 31 will rotate as the saddle 72 is rotated on the axis provided by the pivot pins, indicating the angle of saddle rotation. Two setting pins 76 are passed through holes on each side of the saddle 72, and through semi-circular slots 84 in the tool carriage side plates 70 and fastened with nuts to secure the saddle at any selected angle to the horizontal. The protractor plate 30, pointer 31 and the saddle setting pin 76 fastenings in the plate slots 84, are clearly shown in FIGS. 7 and 8. These views are respectively, a left side elevation view and a right side elevation view of the tool carriage 5.

Figure 7:
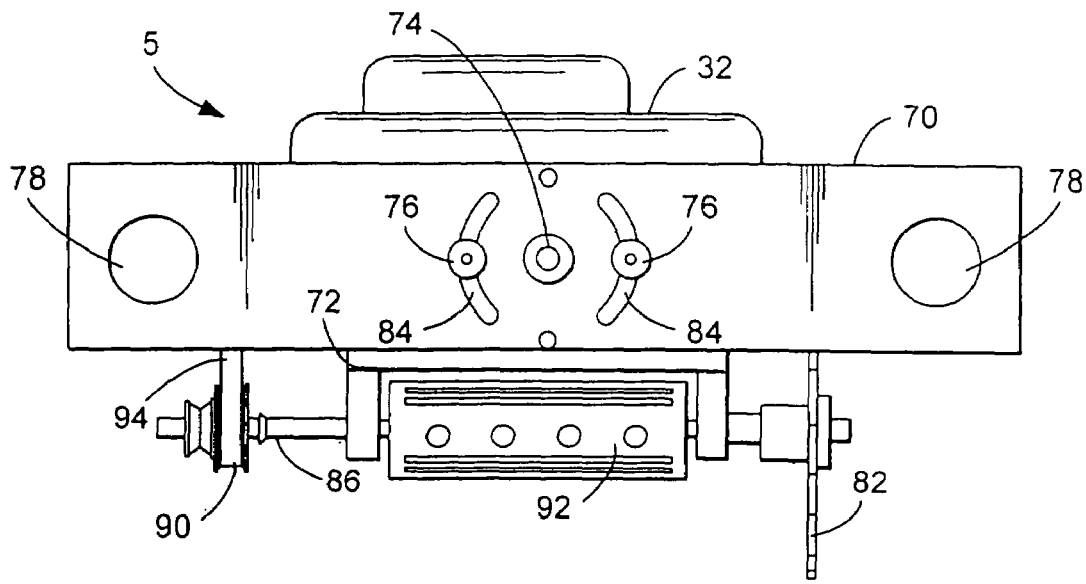
FIGS. 7 and 8 are respectively, a left side view and right side view of the tool carriage, particularly showing parts that are mounted to the bottom of the saddle; detail of the saddle rotation angle indicator plate and means of fastening in place.
Figure 8:
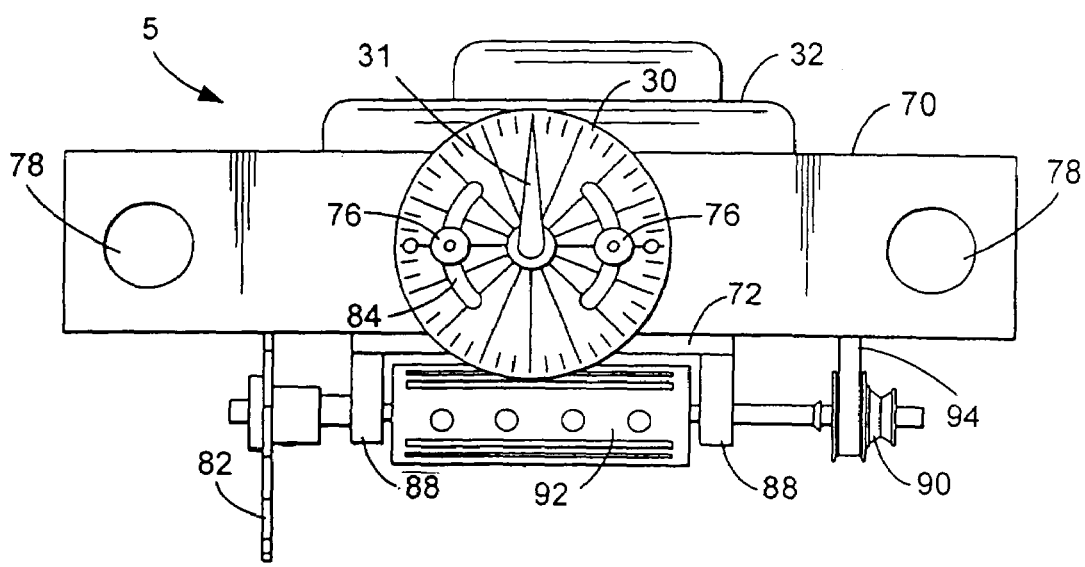

An electric motor 32 with an output pulley 80 is mounted on the saddle 72. As shown in FIGS. 7 and 8, the motor pulley 80 is connected by a drive belt 94 to one of two pulleys 90 that are located at near one end of a drive shaft 86. The drive shaft 86 is supported by two separated bushing blocks 88 that are attached centrally to the underside of the saddle 72.

In these embodiment drawings, a circular saw blade 82 is shown connected to a chuck at one end of the drive shaft 86, and a planing cutter 92 is mounted to the drive shaft between the bushing blocks. These are typically used tools.

Other tools such as twist drills, various countersinks, auger bits and the like, could be connected to the chuck in place of the saw blade. Tools like a sander could also be so connected.

The utility of all these tools is enhanced by the ability to adjust the saddle 72 orientation to any angle within plus or minus 45 deg. of the horizontal, or to fix the saddle at 90 deg to the horizontal. To set the saddle orientation at an angle other than horizontal, all that is needed to do is to loosen the nuts on the ends of the angle setting pins 76 on both sides of the tool carriage 5. The saddle 72 may then be rotated in the tool carriage plate 70 slots 84 to the angle shown by the pointer arrow 31, and the angle setting pins 76 tightened in place. This procedure will cover most likely angular cuts and operations. For a 90 deg. rotation setting, the setting pins 76 must be removed and reinstated in place after the saddle has been rotated 90 deg.

Regarding the stated accuracy of the vertical travel of the transport assembly 4 and carriage tools; for some possible wood working applications, an accuracy within 0.001 in. is required. This can be achieved by the attachment of a precision probe to a carriage side plate, with the probe tip resting on the table top 3 surface or on the work. The probe has a dial indicating travel distance to within 0.001 in.

Such a probe has been developed by the inventors and a patent application for the probe is anticipated.

As described above, the invention woodworking platform has been tested and shown to be highly accurate in the performance of cutting and shaping wood pieces; having an error of only 0.003 in. With the use of an added measuring probe developed by the inventors, the error is reduced to as little as 0.001 in. Provision is also made for performing accurate angular cuts, using a variety of tools. Therefore, it is believed that the described preferred embodiment achieves the objects of the present invention. Alternative embodiments and modifications will be apparent to those skilled in the art. These and other modifications are considered to be equivalent and within the spirit and scope of the present invention.

Having described the invention, what is claimed is:

1. An adjustable woodworking platform comprising:
(a) a "U"-shaped metal structure defining an upper frame of said platform, said upper frame comprising:
an oblong shaped, rigid frame top made of two long rails and two short rails joined together at their ends and disposed in a plane; said short rails, each defining an end member of said frame top, said long rails, each defining a cross member of said frame top; said frame top including two metal straps which are located a distance apart, and attached to said cross members as frame stiffeners;
support legs made of one inch diameter, stainless steel tubing; a support leg being attached to each corner of said frame top at 90 deg. to said plane of said frame top;
two long, threaded lead screws; each lead screw being centered between two support legs that are located at an end member of said frame top, said lead screws extending through holes in said frame top and including a handle for manually rotating said lead screws; and,
first means for rotating said lead screws simultaneously;

(b) a transport assembly comprising two long, tubular rails and two end plates that are disposed in a horizontal plane, with each rail being placed between said end plates and connected at ends to an end plate, forming an oblong rectangle; said end plates, each having two vertical first holes which are located and spaced apart to allow two said support legs, each to pass through a first hole, and a centrally located, threaded second hole that is sized to engage a vertical lead screw which extends down from said frame top; said first holes, each end plate having an inserted bushing to facilitate sliding on two end support legs; said transport assembly, being horizontally mounted slidingly on two said end support legs that pass through said first holes and bushings at each said end plate, and at the same time engaging said lead screws;

(c) a tool carriage that is slidingly mounted on said transport assembly, said tool carriage comprising:

a metal saddle having a flat center portion joined to two opposing side walls and forming a "U" shape; each side wall including a centrally located third hole for a pivot pin and including two small fourth holes which are positioned a small distance apart horizontally, on either side of said third hole for use with fastening bolts;

a cylindrical electric motor, having an axial drive shaft with a mounted first drive pulley, extending from one end; said motor being mounted on the center portion of said saddle, and placed centrally in parallel with said side walls;

a tool drive shaft that is supported by two separated bushing blocks; said bushing blocks being attached to said center portion of said saddle underneath said center portion, directly under, and in line with a drive shaft of said motor; said tool drive shaft extending beyond said bushing blocks and including at one end, a chuck for securing a tool, and mounting at a distal end, one or more second drive pulleys; said tool drive shaft being oriented so that said second drive pulleys on said drive shaft are immediately under said first drive pulley on said motor;

a drive belt that is connected to said first and second drive pulleys and transmits motor torque to said tool drive shaft; and, two identical, metal oblong, carriage side plates, each having a centrally positioned fifth hole for accepting a pivot pin, and having a large sixth hole that is located near each end, including a bushing that is seated in said sixth hole and sized for sliding along said rails of said transport assembly; said carriage side plates, each including a plurality of openings for fastening bolts, that are located surrounding the intended fifth hole for a pivot pin;

said saddle being pivotably fastened and supported between said carriage side plates by pivot pins, with the location of said drive pulleys defining a rear of said saddle, and the location of said chuck on said tool drive shaft defining a front of said saddle;

said tool carriage being mounted on said horizontal slide rails of said transport assembly and able to be slid from one side of said upper frame to the other;

(d) second means for indicating the amount and number of rotations of said lead screws and thereby, the amount of vertical travel distance up or down of said transport assembly;

(e) third means for orienting and setting, the front of said saddle tilted at an angle of up to plus or minus 45 deg. to a horizontal plane defined by said side plates, or setting said front of said saddle at 90 deg. to said horizontal plane; and, fourth means for indicating the tilt angle of said saddle;

(f) a rectangular lower frame which is fabricated from steel channels which are welded or bolted together to form a table frame having four legs; said table frame having two long, paralleled channels serving as top front side and top back side, and two short channels serving as top left side and top right side, and joined to form a table frame top, said table frame top having a front edge and a back edge;

said upper frame being bolted vertically to said table frame on said top left side and top right side at said rod legs; oriented so that said front of said tool carriage faces said front edge, and said horizontal rails of said transport assembly are aligned parallel with said front edge; said lead screws sitting on thrust bearings which allow said lead screws to turn in place;

(g) a flat, smooth surfaced, rectangular wood table top, having a plurality of wide slots cut from adjacent to a front edge to near a back edge, said slots being disposed evenly spaced apart across said table top; said table top including clamps for clamping a workpiece to said table top through said slots;

(h) fifth means for floatingly supporting said table top on said table frame top, enabling said table top to be moved a precise measured distance in a forward or backward direction with respect to said front edge of said table frame top; and, (i) sixth means for adjusting and fixing in place the angular position of any workpiece that may be placed on said table top for working;

in operation, said transport assembly is lowered by rotating said handle that is attached to an end of a lead screw, until said tool carriage is located precisely at a desired distance above a workpiece which is clamped to said table top at any angle in the plane of the table top; the saddle in the tool carriage may have been set at a given angle with respect to the horizontal plane, prior to lowering the tool carriage, and the table top may be manually moved forward or backward a selected precise distance at any time during the operation.

2. The woodworking platform as defined in claim 1, wherein:

said first means for rotating said lead screws simultaneously comprises a toothed driver wheel that is attached axially to a top extending portion of each lead screw and extends radially above said frame top, and a continuous loop linked chain which is fitted around and engages each driver wheel and is made taut by an adjustable tightening means that is located centrally mounted on said frame top.

3. The woodworking platform as defined in claim 1, wherein:

said second means for indicating the amount and number of rotations of said lead screws comprises a pointer that points outwards and is connected to a lead screw, and a circular indicator plate that is inscribed with division marks around a peripheral surface and is connected axially to said lead screw below said pointer; said pointer rotating with said lead screw and indicating on said indicator plate a 360 deg. full rotation or any inscribed fraction of a rotation.

4. The woodworking platform as defined. in claim 1, wherein:

said third means for orienting and setting, the front of said saddle tilted at an angle, comprises two semicircular slots that are circumferentially disposed on a surface of each carriage side plate around said third hole, and two angle-setting holes that are located on each carriage side plate circumferentially around said third hole at the same radius as said slots; said slots each encompassing an angle of plus and minus 45 deg. with reference to a horizontal plane as defined by the plane occupied by the carriage side plates; said angle-setting holes being located, one hole at an angle of plus 90 deg. to said horizontal plane and the second hole at an angle of minus 90 deg.; said saddle, when fastened with fastening bolts to said carriage side plates through said slots, able to be pivoted, oriented and set at a selected angle of up to plus or minus 45 deg.; said angle-setting holes being used for fastening only at times when it is necessary to have said saddle and cutting tools oriented upwards or downwards at 90 deg.

5. The woodworking platform as defined in claim 4, wherein:

said fourth means for indicating the tilt angle of said saddle comprises a protractor plate which is fastened to a carriage side plate and centered on said fifth hole, and an arrowhead shaped pointer which is fastened to an end of a pivot pin that extends through said fifth hole and through said protractor plate; said protractor plate being oriented so that a marked 0 deg. to 180 deg. line is parallel to the horizontal plane, and the pointer is directed at the 90 deg. mark on the protractor plate; said pointer rotating with a rotation of said saddle and indicating the tilt angle of said saddle.

6. The woodworking platform as defined in claim 1, wherein:

said fifth means for floatingly supporting said table top comprises a second lead screw with a nut screwed on and having a rotation handle at one end, and two support rods, each rod having two bushings disposed separated a distance apart on the rod; said second lead screw being mounted centrally across said table frame top with an end held in a thrust bearing which is mounted on a back side top member, and a distal end held by a bushing mounted on a front side top member, with said rotation handle extending in front of said table frame top; said support rods being disposed parallel, an equal distance apart on either side of said second lead screw and mounted on bushings that are fastened to said table frame top; and, a centrally located deep recess that is cut in an undersurface of said table top, said groove being sized to closely seat a projecting edge of said nut that rides on said second lead screw;

said table top, when placed on said bushings on said support rods and fitting on top of said nut, being enabled to float above said table frame top and be moved discrete precise distances forward or backward with respect to the front edge of the table frame.

7. The woodworking platform as defined in claim 1, wherein:

said sixth means for adjusting and fixing in place, the angular position of any workpiece on said table top, comprises a fence made from an elongate slotted metal channel which includes a flat, arrow head shaped pointer projecting linearly from one end, and a second protractor plate which is mounted on a flat-sided support bar;

said fence being pivotally connected to said second protractor plate at said pointer, so that as said fence is rotated, said pointer indicates the angle of the fence edge off zero; said second protractor plate being disposed at left of said table top, with said support bar sliding against a table top left edge and said fence lying on said table top parallel with a front edge of said table top, and pointing to zero deg. inclination on said second protractor; said fence, with a workpiece bearing against an edge, able to be manually rotated and fastened to said table top with bolts through two or more table top slots, holding an aligned workpiece at the fixed angle.

8. The woodworking platform as defined in claim 3, wherein a third drive pulley is axially attached to said lead screw above said rotation indicator plate for connection by a belt to a stepping motor that may be mounted on said upper frame, said stepping motor drive and control of the rotation of said lead screws providing an alternative to manual rotation and control.

9. The woodworking platform as defined in claim 1, wherein said tool carriage includes a planing cutter which is located underneath said saddle and mounted on said tool drive shaft between said bushing blocks.

* * * * *